(12) United States Patent
Richardson et al.

(10) Patent No.: US 9,430,947 B2
(45) Date of Patent: Aug. 30, 2016

(54) MARITIME AUTONOMOUS STATION KEEPING (MASK)

(71) Applicant: Raytheon Company, Waltham, MA (US)

(72) Inventors: James J. Richardson, Temecula, CA (US); Robert M. Fries, Irvine, CA (US); Robert C. Saunders, San Diego, CA (US)

(73) Assignee: Raytheon Company, Waltham, MA (US)

( * ) Notice: Subject to any disclaimer, the term of this patent is extended or adjusted under 35 U.S.C. 154(b) by 525 days.

(21) Appl. No.: 13/671,380

(22) Filed: Nov. 7, 2012

(65) Prior Publication Data

US 2014/0129126 A1    May 8, 2014

(51) Int. Cl.
*G05D 1/00* (2006.01)
*G08G 3/02* (2006.01)
*G01S 19/51* (2010.01)

(52) U.S. Cl.
CPC ............... *G08G 3/02* (2013.01); *G01S 19/51* (2013.01); *G05D 1/00* (2013.01)

(58) Field of Classification Search
CPC ......... G06G 7/78; G01S 1/02; G01S 13/931; G01S 19/41; G01S 17/936; G01S 5/0036; G01S 5/0072; G01C 21/22; G08G 1/16; G08G 1/22; G08G 3/02; G05D 1/0278; G05D 1/0295; B60W 30/16; B60W 2050/0078; B60W 30/12
USPC ................. 701/2, 3, 21, 300, 301, 408, 518; 342/41, 357.75, 357.45, 357.34, 179; 244/2; 114/285, 230.1
See application file for complete search history.

(56) References Cited

U.S. PATENT DOCUMENTS

| | | | |
|---|---|---|---|
| 6,945,187 B1 * | 9/2005 | Woodall et al. | 114/256 |
| 7,768,451 B2 * | 8/2010 | Wu et al. | 342/357.23 |
| 2003/0147064 A1 | 8/2003 | Timothy et al. | |
| 2006/0081166 A1 * | 4/2006 | Montgomery et al. | 114/230.1 |
| 2009/0295836 A1 * | 12/2009 | King | 345/666 |
| 2010/0070118 A1 * | 3/2010 | Yamada et al. | 701/21 |

OTHER PUBLICATIONS

CAPT James A. Barber Jr. USN (Ret.), "Naval Shiphandler's Guide", 2005.*

(Continued)

*Primary Examiner* — Jelani Smith

(57) ABSTRACT

Technology for determining a point-to-point separation between a first ship (e.g., guide ship) and a second ship (e.g., following ship) is disclosed. One approach can include maritime autonomous station keeping (MASK) interactive device comprising a communication module and a processor. The communication module can be configured to receive a following ship reference point (SRP) generated by at least one differential global positioning system (DGPS) receiver on a following ship relative to a guide SRP generated by at least one DGPS receiver on a guide ship. The processor can be configured to generate a plurality of fixed following reference edge points (REPs) relative to the following SRP representing a following ship hull, generate a plurality of fixed guide REPs relative to the guide SRP representing a guide ship hull, and monitor a plurality of distances between the plurality of following REPs and the plurality of guide REPs.

21 Claims, 12 Drawing Sheets

(56) References Cited

OTHER PUBLICATIONS

Lightbody, et al; Techniques in Relative RTK GNSS Positioning; Trimble White Paper; Jan. 1, 2010; 6 pages; Trimble Navigation Limited.
Oda, et al.; New Berthing Support System Using High Accuracy Differential GPS—Application to Safety Navigation Management (translation); Journal of the JIME; Jan. 1, 2009; 9 pages; vol. 44, No. 1; JIME.
Pearce; A high Resolution FMCW X-band Radar Sensor for Vessel Underway Replenishment at Sea Applications; Radar Conference, 2010 IEEE; May 10, 2010; pp. 647-650; IEEE, Piscataway, NJ.
Pedersen, et al.; Field Testing of GPS Applications in Ship-to-Ship Lightering Operations; ITM 2010—Proceedings of the 2010 International Technical Meeting of the Institute of Navigation; Jan. 27, 2010; 5 pages; The Institute of Navigation, Manassas, Virginia.
Yamada, et al.; Final Acceptance Test on Advanced Ship Maneuvering and Mooring Support System at Ship-to-ship Transfer Operastions by Fender Monitoring System of Pneumatic Fenders; Proceedings of the Twenty-second (2012) International Offshore and Polar Engineering Conference; Jun. 17-22, 2012; pp. 901-908; The International Society of Offshore and Polar Engineers (ISOPE), Rhodes, Greece.
PCT Application PCT/US2013/058286; filed Sep. 5, 2013; Raytheon Company; International Search Report mailing date Mar. 20, 2014.
http://www.marinedd.com/gallery/6-paq-mse-support; 3 pages, copyright 2011.

* cited by examiner

MARITIME AUTONOMOUS STATION KEEPING (MASK)

BACKGROUND

Satellite navigation systems, such as the global positioning system (GPS), enable a receiver to determine a location from ranging signals received from a plurality of satellites. The ranging signals can be broadcasted on frequencies, such as the L1 signal (1.57542 gigahertz [GHz]) and/or L2 signal (1.2276 GHz). L1 can have a wavelength of about 19 centimeters (cm) and L2 can have a wavelength of about 24 cm. Position can be determined from code and/or carrier phase information. A code division multiple access (CDMA) code is transmitted by the GPS satellites to the receiver and correlated with replica codes to determine ranges to different satellites. Accuracy can be enhanced using real-time kinematic (RTK) processing of carrier phase information. Accuracy at the level of tens of centimeters is possible with RTK carrier phase integer ambiguity resolution. RTK carrier phase integer ambiguity resolution can be used in applications with very accurate positional location information requirements and high integrity requirements.

High-accuracy relative positioning data with minimally acceptable integrity levels provided by RTK processing can be used in land surveying, precision agriculture, and/or construction applications. In other applications, such as those that present a substantial risk to human life, precision positioning with both high accuracy and high integrity is desirable. For example, applications that involve landing an aircraft, mid-air refueling, or coordinated formation flights can use a RTK positioning technique that is both highly accurate and also provides a high integrity level (e.g., high integrity protection level).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
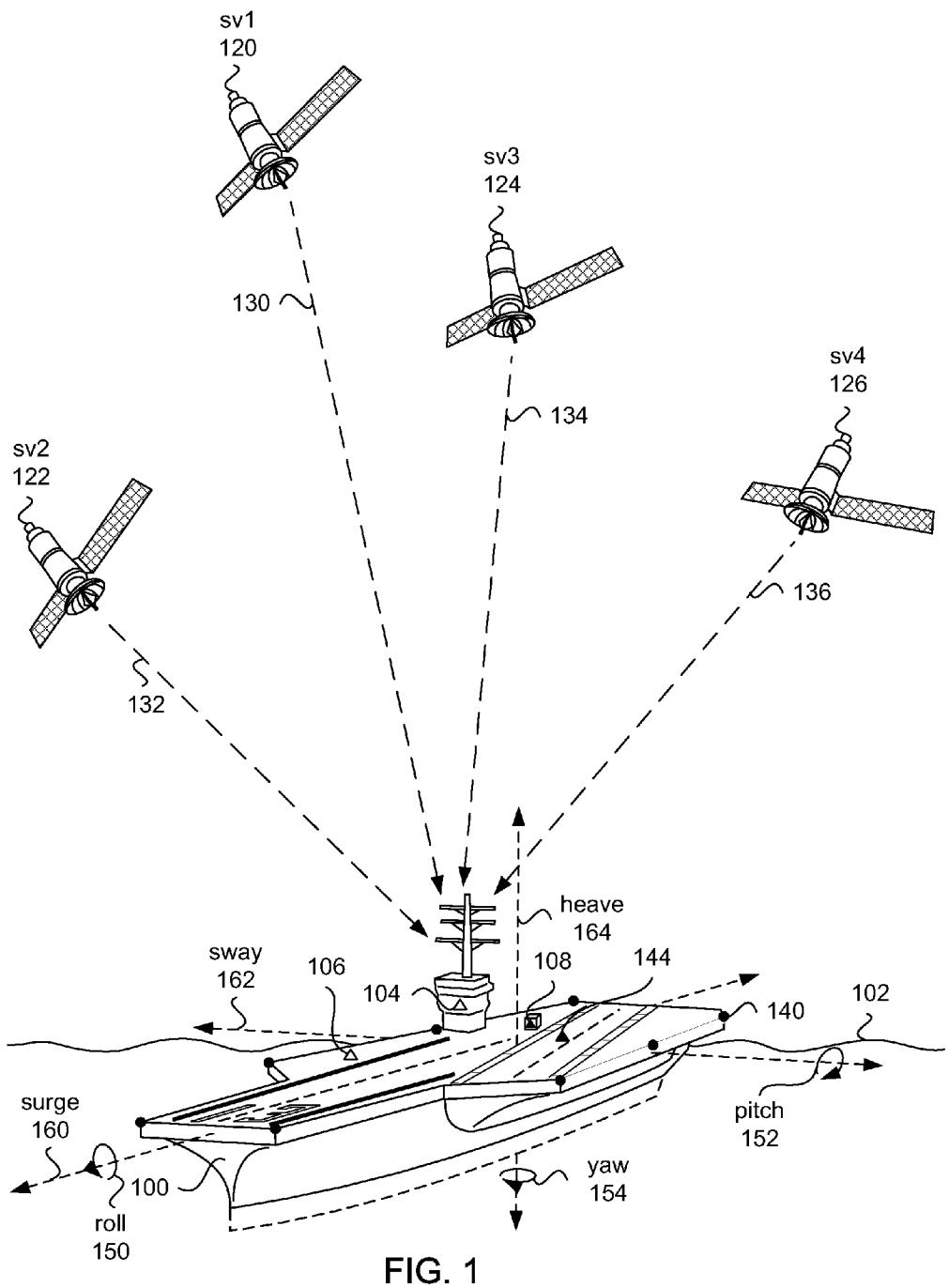
FIG. 1 illustrates a diagram of a plurality of global positioning system (GPS) satellites in communication with a GPS receiver on a maritime vessel (e.g., ship) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Many maritime operations can require two or more vessels to maintain a predetermined, desired relative position to one another for long periods of time, such as the underway replenishment (UNREP) operation used by the United States Navy or the replenishment at sea (RAS) operation used by North Atlantic Treaty Organization (NATO)/Commonwealth. The UNREP allows a maritime ship or vessel out at sea to periodically resupply and refuel without returning to a port. As used herein, the ship or the vessel may be used interchangeably for any maritime vessel or vehicle (e.g., submarine or ship). Vessel-to-vessel station keeping (e.g., UNREP) can be used to replenish (e.g., resupply or refuel) a vessel out at sea from another vessel. The UNREP can involve transferring supplies, fuel, munitions, and stores between a resupply vessel and a receiving vessel while underway at sea. The UNREP (or alongside connected replenishment (CONREP)) can be a very man-intensive and dangerous process with many manual labor processes. For example, current practice can include deck crews to man a physical distance line with marker flags strung between the two ships to maintain distance between the ships, which can be a very dangerous, error-prone and man-intensive task.

In the UNREP (or other vessel-to-vessel station keeping), a following ship can adjust a course and speed to a guide ship to maintain a constant distance between a guide ship transfer station and a following ship transfer station. The guide ship can also be referred to as a control ship. The following ship can also be referred to as a monitor ship or an approach ship. Either the guide ship or the following ship can be a delivery ship, a supply ship, a receiving ship, a customer ship, or a transferring ship. The transfer station can be a point on the ship where a cable, hose, or other mechanism is attached to the ship to transfer fuel or supplies to the other ship. In an example, the guide ship can maintain a constant (or known) course and speed to assist the following ship in maintaining relative distance between the guide ship and the following ship.

The following ship can attempt to maintain both a lateral (e.g., right or left) and a longitudinal (e.g., forward or backward) position relative to the guide ship, which can be adjusted by the following ship course and speed. Maintaining both a lateral and a longitudinal position by the following ship can be a difficult, high-intensity task. The station keeping process can be visually intensive for lookout personnel where an engine order to adjust the following ship speed can be determined by visual observation. In a lateral station keeping task, a physical "distance line" (e.g., cable or rope) with distance marking flags can be stretched across the deck of each vessel to determine a distance between the hulls of the vessels. Anywhere from 5 to 10 sailors (i.e., watchstander or deck crew) on the deck of each vessel can be used to maintain a physical "distance line." The lookout personnel can observe the distance line and make a verbal call to a helmsman to make a course correction. The course correction may occur in ½° increments. In an example, the UNREP process can have a duration of approximately 4 hours, during which time the bridge crew and deck crew can rotate every 30 minutes. UNREP operation can be one of the most man-intensive non-emergency tasks at sea. In addition, the UNREP can be a high risk, error prone operation. Due to the visual nature used to make distance and speed determinations, the lookout personnel's perceived proximity can be misleading, thus generating errors. For example, fore/aft (e.g., longitudinal) deviations can be hard to judge. Fore can refer to the area near the bow or forward part of a vessel. Aft can refer to the area near the stern or tail. The aft can refer to the inside (onboard) rearmost part of the vessel, while stern can refer to the outside (offboard) rearmost part of the vessel. Fog and weather can obscure a view of the distance line, and thus affect the accuracy of the distance between vessels. Verbal calls can be misstated, misheard, and/or missed. Break-aways and too-close alerts can also be fairly common. Ship hull dynamics can also have an effect, such as hydrodynamics, which can pull ships together via a Venturi effect, which can result in occasional collisions. The Venturi effect can generate a reduction in fluid pressure that results when a fluid flows through a constricted area, such as a waterway between vessels. The Venturi effect can be determined mathematically based on the distance between vessels, speed of the vessels, and depth of the water. Safety hazards during the UNREP operation can include ship collisions and man over board (MOB) risk to distance line handlers in keeping distance line tension, both of which do occur.

Based on the foregoing, disclosed and discussed herein is a maritime autonomous station keeping (MASK) method, device and/or system to address the aforementioned problems or difficulties with current station keeping practices. Maritime autonomous station keeping can provide a method, device, and/or system for determining a point-to-point separation between a first ship (e.g., guide ship) and a second ship (e.g., following ship). MASK can provide an automated and accurate vessel-to-vessel station keeping operation (i.e., maintaining a desired relative position) using less manpower while underway in the maritime environment. MASK can use a differential GPS (DGPS) receiver to determine a relative position between a guide ship and following ship.

Relative navigation systems using differential global positioning can have both high accuracy and high integrity. A relative navigation system can use at least two positioning receivers (e.g., GPS receivers) that move independently from each other or that can vary position relative to each other. A relative navigation system can have a reference platform or reference receiver (that may be moving) and remote user platforms or user receivers (that may also be moving) that may generate a relative position to the reference system with high accuracy and integrity. Integrity can be based on a small probability that a relative navigation error could exceed a calculated protection level (PL). The reference receiver and the user receiver (e.g., user GPS receiver) can each include multiple receivers, which can provide redundancy for error checking and/or fault protection.

FIG. 1 illustrates a DGPS receiver 104 of a ship 100 on a waterway 102 receiving GPS signals 130-136 from GPS satellites 120-126 (also referred to as space vehicles (SV)). The global positioning system (GPS) operates on the principle of geometric triangulation. With ranging measurements from at least three GPS satellites, a user's position on or near earth's surface can be determined. Using at least four GPS satellites, an exact time can be determined, which can improve accuracy. A differential GPS (DGPS) processor allows accurate relative positioning between a reference receiver (e.g., on a guide ship) and a user receiver (e.g., on a following ship). The DGPS receiver can operate by differencing the GPS ranging measurements between a reference receiver and a user receiver to determine the relative position. In an example, the DGPS receiver and/or a processor in a MASK device (and/or system) can utilize dual frequency GPS receivers with carrier phase (CP) tracking along with pseudo range smoothing, CP real time kinematic (RTK) positioning, an almost fixed integer ambiguity (AFIA) solution, and/or geometry extra-redundant almost fixed solutions (GERAFS). Pseudo range smoothing, such as divergence-free carrier smoothing (DFS), can provide significant attenuation of pseudo-range (PR) and multipath noise without incurring additional errors due to the effects of ionospheric divergence. Carrier phase RTK positioning can provide high accuracy relative positioning. The GERAFS provides high integrity assurance in CP integer ambiguity resolution as shown and described in U.S. Pat. No. 7,768,451 to Wu et al., which is herein incorporated by reference in its entirety. High accuracy positioning can use reliable methods, such as GERAFS, to resolve CP integer-cycle ambiguities.

In an example, the GERAFS approach can provide at least centimeter level positioning accuracy with high integrity suitable for safety critical applications, such as station keeping. CP integer ambiguity resolution can be used for high accuracy position determination with high integrity.

In an example, the DGPS receiver 104 can be used to generate ship reference point (SRP) 144. The SRP can be located at a DGPS receiver location, a center of mass location, or other predetermined position relative to at least one DGPS receiver. A set of reference edge points (REPs) 140 representing, for example, a perimeter of the ship to protect, such as the hull of the ship can be generated from the SRP. Each REP in the collection of REPs can be at a fixed, predetermine distance from the SRP based on the ship's configuration. In an example, a first DGPS receiver 104 can be used with a second GPS receiver 106 (e.g., DGPS receiver) at a fixed position relative to the DGPS receiver to generate a translation motion and a rotation motion on the SRP and/or REPs. In another example, the DGPS receiver 104 can be used with an inertial navigation system (INS) and/or inertial measurement units (IMU) 108 at a fixed position relative to the DGPS receiver to compensate for the translation motion and a rotation motion about an axis on the DGPS receiver, SRP, and/or REPs. The INS can be used to determine the ship dynamics (including rotation) on the DGPS receiver. The INS can be based on measurements from an IMU that can include a motion sensor, an accelerometer, a gyrometer, a gyroscope, a magnetometer, a barometer, a rotation sensor, or a combination of these sensors. The motion of a ship at sea can have the six degrees of freedom of a rigid body, which can include three translation motions and three rotation motions. The translation motions can include heaving 164 (i.e., moving up or down), swaying 162 (i.e., moving left or right), and surging 160 (i.e., moving forward or backward). The rotation motions can include pitching 152 (i.e., tilting up or down), yawing 154 (i.e., turning left or right), and rolling 150 (i.e., tilting side to side).

Figure 2A:
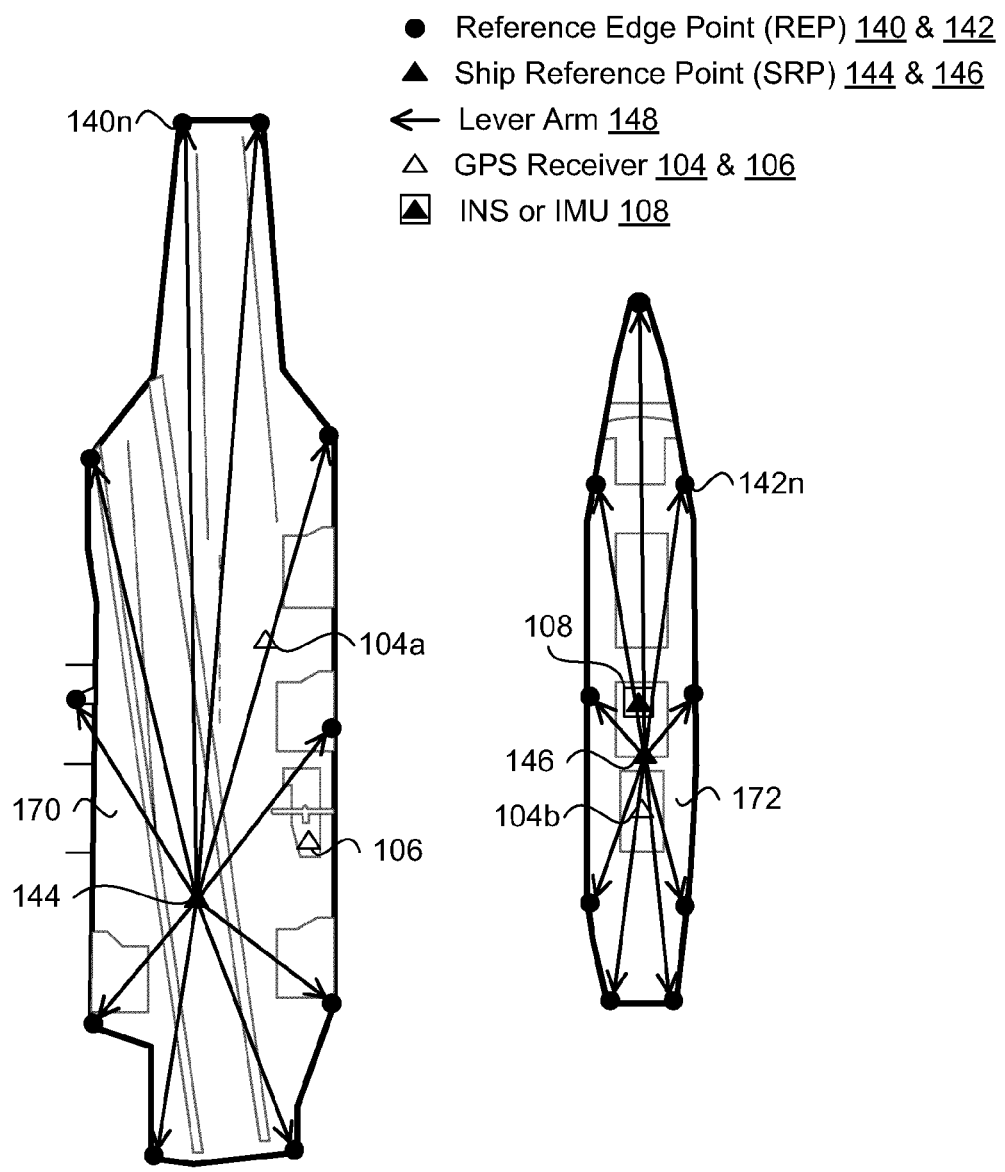
FIG. 2A illustrates a diagram of a guide ship and a following ship each with a ship reference point (SRP) and reference edge points (REPs) in accordance with an example.

FIG. 2A illustrates an example of a guide ship 170 (e.g., aircraft carrier) with a guide SRP 144 and guide REPs 140 and 140*n* and a following ship 172 (e.g., battleship) with a following SRP 146 and following REPs 142 and 142*n*. In another example, the battleship can be the guide ship and the aircraft carrier can be the following ship, when the aircraft carrier is following the movements of the battleship. In another configuration (not shown), as will be recognized by those skilled in the art, a plurality of following ships can be used to follow a guide ship or another following ship. FIG. 2A illustrates that a lever arm 148 vector can be used to define a relationship between a SRP and each REPs, which can be used in calculations. In an example, the guide ship can be configured with a DGPS receiver 104*a* and a second GPS receiver 106, and the following ship can be configured with a DGPS receiver 104*b* and an INS or IMU 108. In another example, a lever arm vector (not shown), can be used to define a relationship between the SRP and the DGPS receiver, the GPS receiver, and/or the INS or IMU.

Figure 2B:
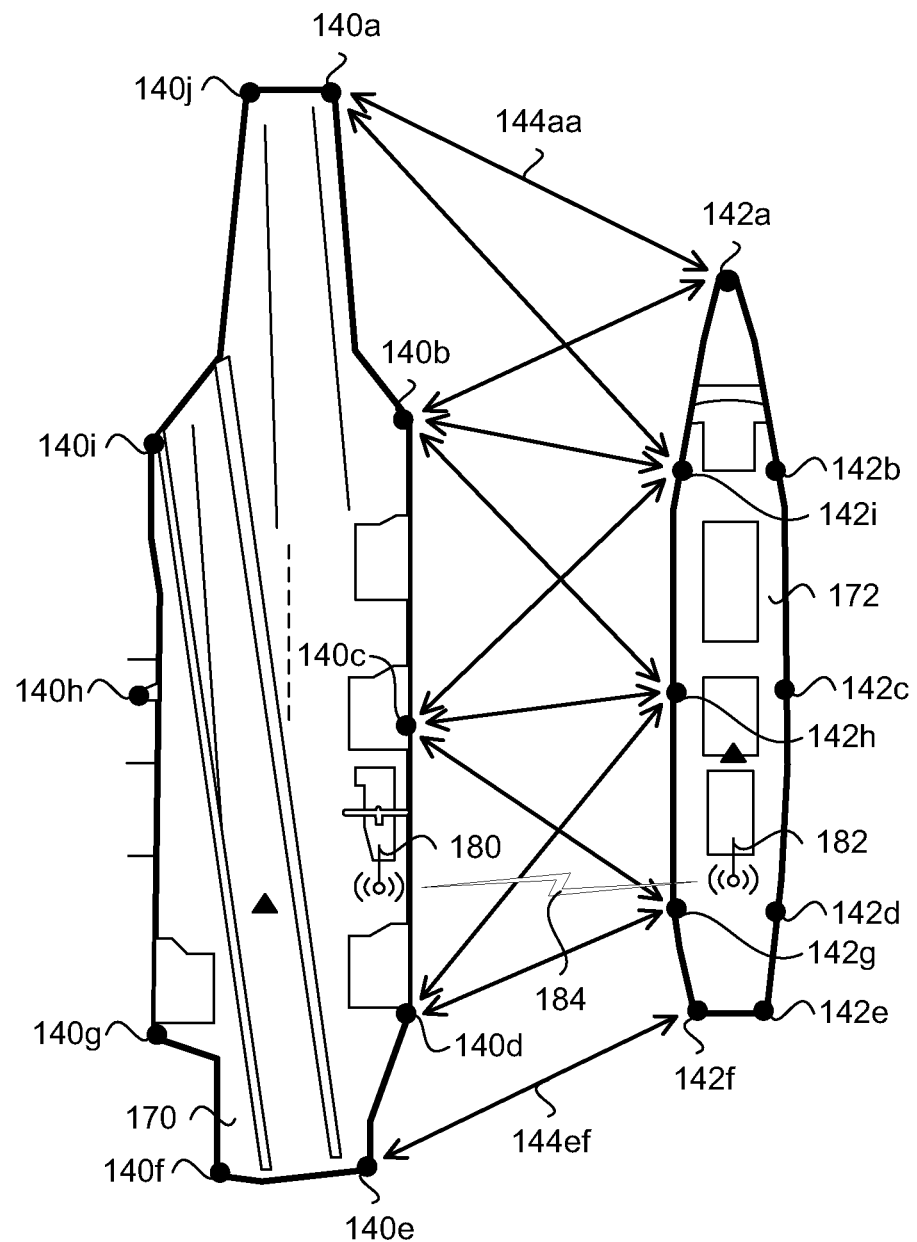
FIG. 2B illustrates a diagram of reference edge points (REPs) of a guide ship monitored in relationship to REPs of a following ship in accordance with an example.

FIG. 2B illustrates the guide REPs 140*a-j* of a guide ship 170 monitored in relationship to the following REPs 142*a-i* of a following ship 172. With the monitoring of the distance between the guide REPs and the following REPs, the MASK method, device, and/or system can protect the entire length (or other dimension or configuration) of both ships' hulls, instead of just monitoring a single point of one vehicle relative to a single point of another vehicle, such as an aircraft landing gear or arresting hook to a single aircraft carrier touchdown point. In an example, a subset of guide REPs 140*a-e* in closer proximity to the following REPs 142*a,f-i* may be monitored relative to each other, such as distances 144*aa* and 144*ef*, or the REPs on a starboard side of the guide ship and the REPs on a port side of the following ship, instead of monitoring all the guide REPs relative to all the following REPs. Port is a nautical term referring to the left side of a ship as perceived by a user on board facing the bow or the front of the ship. Starboard is a nautical term referring to the right side of the ship as perceived by a user on board facing the bow or the front of the ship. For example, monitoring a guide REP 140*a* relative to a following REP 142*a* can include generating a distance 144*aa*, a rate of change of distance, or other similar information. The following ship can receive, via a radio 182, a GPS coordinate of the guide ship GPS receiver, guide ship IMU or INS information, a guide SRP location, a guide ship type, guide ship lever arm vectors for the REPs relative to the SRP, guide ship REP locations, a change in guide SRP translation or rotation motion, and/or a change in guide REP via a radio link 180 from a guide ship radio 180. In an example, the following ship can generate the guide REPs from the SRP measurement and the guide ship type. Each type of guide ship can have a different set of REPs relative to a SRP stored in a memory device (e.g., database) of the following ship. In another example, the measurement locations of the guide REPs can be sent directly to the following ship. A processor on the following ship can generate the guide REPs based on information received from the guide ship. In another example, a subset of guide REPs 140*a-e* in closer proximity to the following REPs 142*a,f-i* may be weighted heavier in a monitoring process than other REPs 140*f*-1 or 142*b-e* further away from the other ship.

Figure 2C:
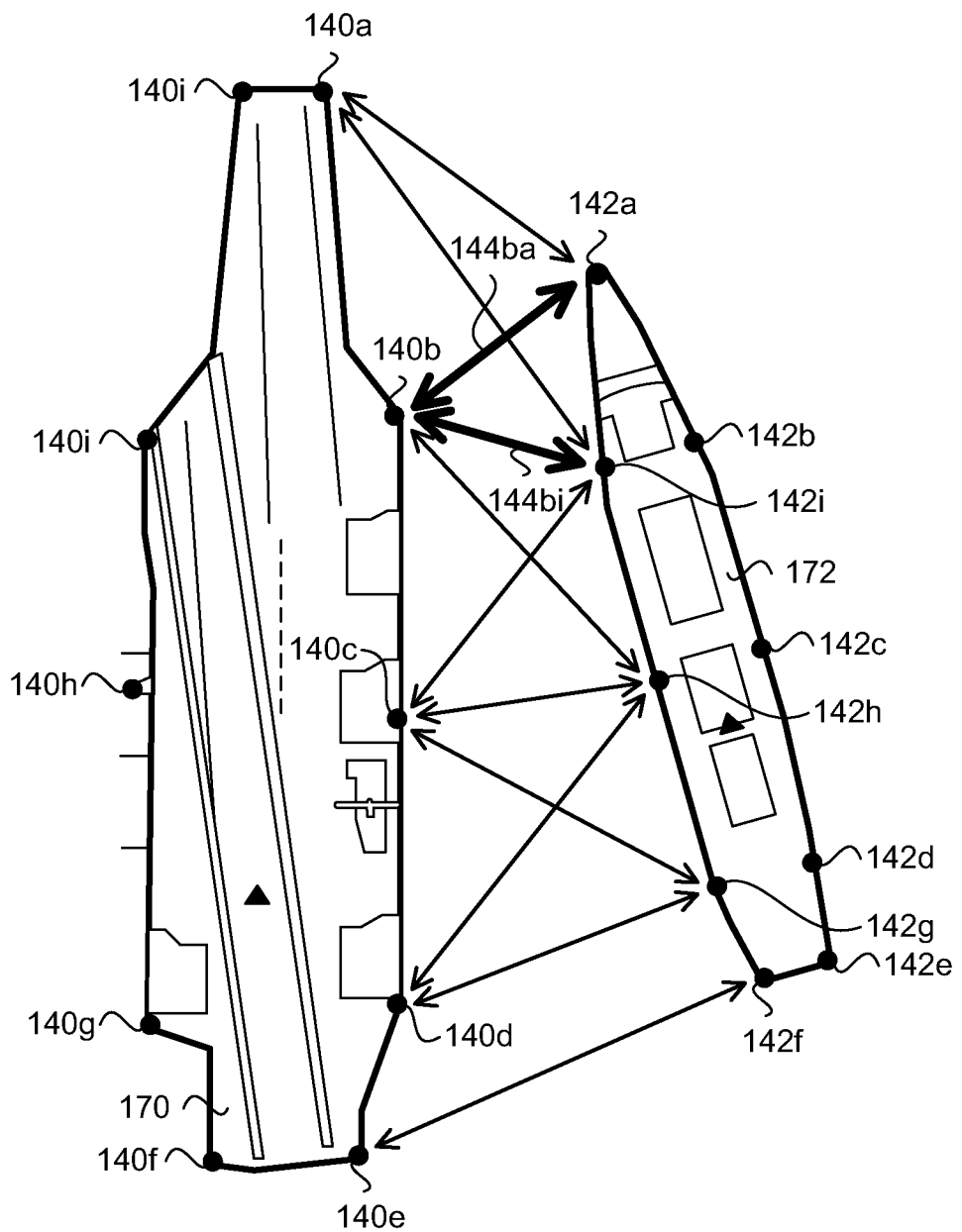
FIG. 2C illustrates a diagram of an alert due to a reference edge point (REP) of a following ship in close proximity to REPs of a guide ship in accordance with an example.
Figure 2D:
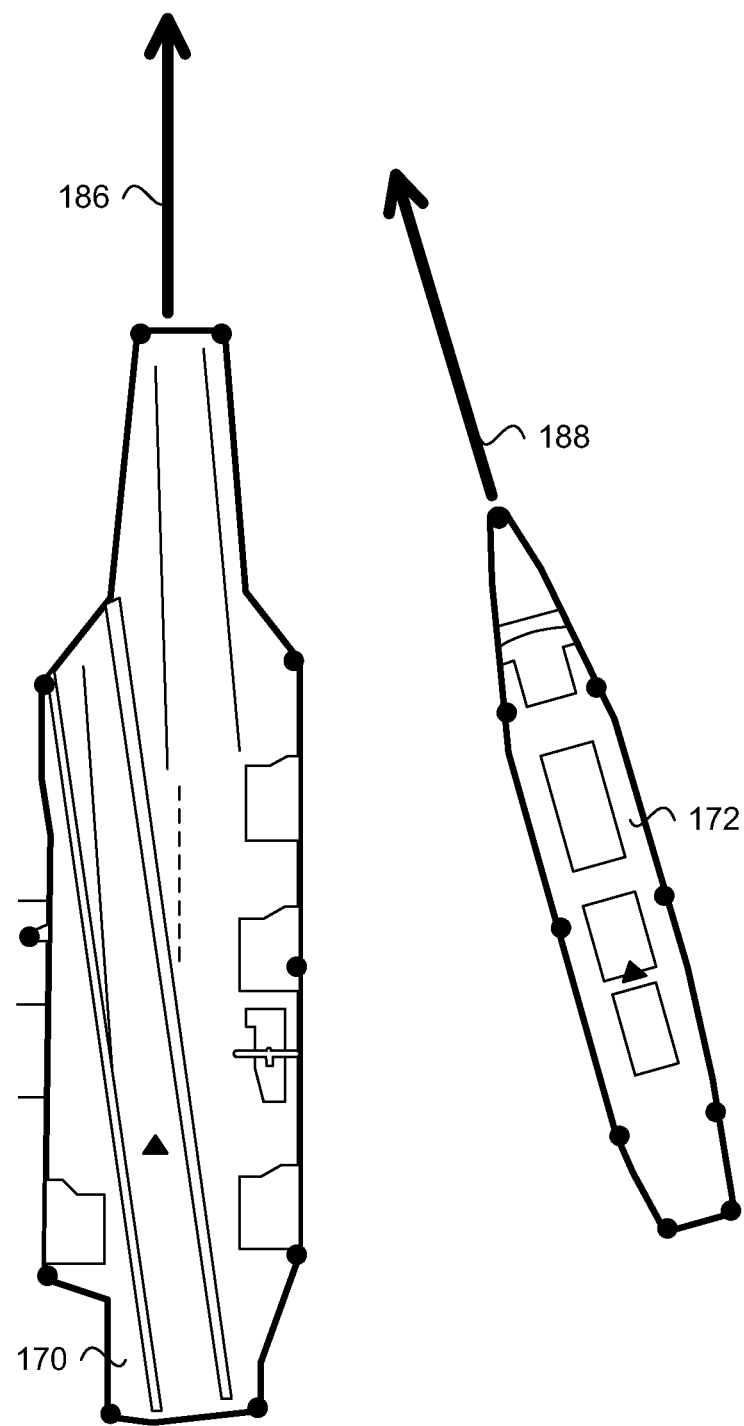
FIG. 2D illustrates a diagram of a course of a guide ship and a following ship in accordance with an example.

In an example, the MASK method, device, and/or system can alert a user and/or make a course or speed correction when a distance 144*ba* and 144*bi* between a guide REP 140*b* and a following REP 142*a, i* fall outside an acceptable established tolerance (e.g., too close or too far away), as illustrated in FIG. 2C. The course can be a direction or route taken or to be taken. The SRP and/or the plurality of REPs can be measured over time to generate a trend, which can be used to predict a course 186 and 188 and speed, as illustrated in FIG. 2D. The movement of REPs can be used to determine the translation and rotation motion of both the guide ship and the following ship, which can reduce or eliminate visual distortions and errors in observations used in station keeping.

In another example, the plurality of REPs can be used to generate a planar model (e.g., 2 dimensional (2-D) model) or a volumetric model (e.g., 3 dimensional (3-D) model) of the guide ship and following ship. The REPs can be used to generate the volumetric model or a partial volumetric model, which can be used to model hull dynamics, such as hydrodynamics, the Venturi effect, and/or ocean currents. The model hull dynamics can be used to modify predictions of the course, translation direction, speed, and/or rotation of the guide ship and following ship. In addition, the MASK method, device, and/or system can use information generated by sensors to measure hull dynamics. For example, sensor can measure a sea state, current, waves, and/or wind.

MASK can improve maritime relative positioning by applying a high accuracy ship-based differential GPS system with high relative positioning accuracy (including GERAFS and other technologies) to vessel-to-vessel station keeping. MASK can provide flexibility for fully-autonomous station keeping (similar to an autopilot) including both observability and control, or MASK can be used for MASK-assisted navigation (MAN) (e.g., "assisted" station keeping capability) for near-perfect, automated observability to a display that can be used for manual ship control by bridge crew (e.g., a conning officer). While fully autonomous station keeping can be more accurate, assisted station keeping may be preferred due to concerns over "trust in autonomy" and preference for a crew to control a ship.

Figure 3A:
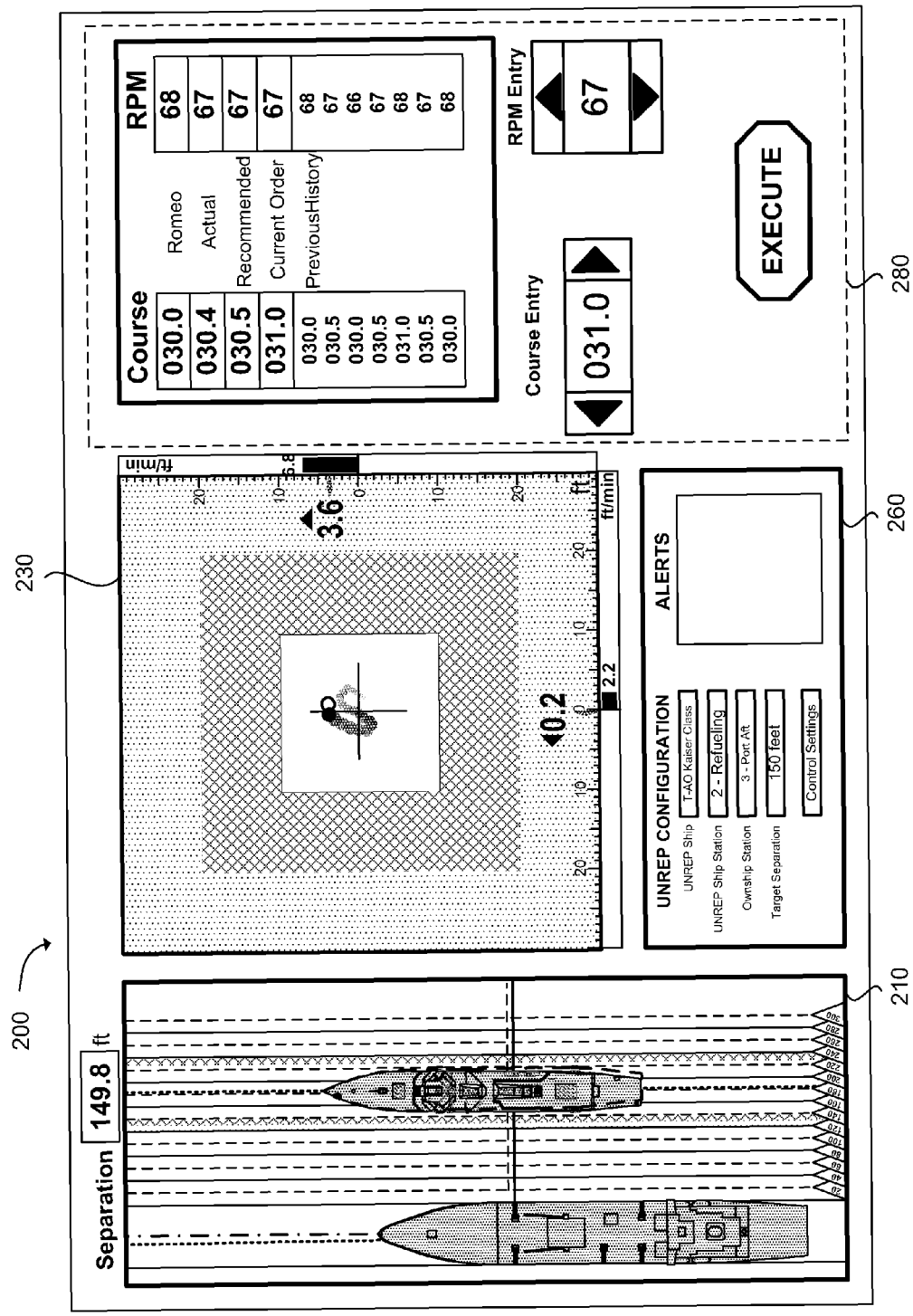
FIG. 3A illustrates a diagram of a maritime autonomous station keeping (MASK) interactive display in accordance with an example.

FIG. 3A illustrates an example of a display that can be used while still allowing manual ship control. Using either fully-autonomous station keeping or MAN, the station keeping operation can realize a manning reduction and a safety benefit of eliminating distance line tenders from the decks of the involved ships (e.g., guide ship and following ship(s)). In addition, MASK can provide the ability to identify multiple specific points of interest on each ship (e.g., "rail edge points" or REPs) and optimize the weighting of the points of interest to provide a minimum-control-input solution for precision station keeping. Using REPs for MAN can also be referred to as rail edge point optimization for MASK assisted navigation (REPO MAN). Furthermore, MASK can provide integrity and an automated fail-safe operation and/or crew warnings when safety or performance thresholds are breached. Not only can MASK reduce the manpower and improve safety of station keeping operations, MASK can lower long-term operational costs for station keeping or other underway or at-sea operations. In another example, MASK can be used to support precision port maneuvering operations. The GPS receiver can be located on a fixed station on a port and the SRP and REPs can be used to represent a perimeter of the fixed station, such as a dock.

The DGPS receiver used in MASK can provide advantages over other types of station keeping operations, such as station keeping based on lasers. Using lasers for station keeping can be problematic because keeping a laser pointed at a desired position on the guide ship can be extremely difficult. In addition, large, deep cargo openings on some ships can created abrupt changes in a range that are not indicative of a true distance to be maintained, so using laser can be even more error prone than using the flags in the manual distance lines.

By using ship-based differential GPS technology, MASK can provide improved observability, near perfect observability, and/or "perfect observability" of the relative positioning between vessels, which can be an order of magnitude improvement (in safety, accuracy, damage, time, and/or cost) over the physical distance line strung between vessels and viewed by an observer to visually read the distance and rate-of-change from the bridge, which can be many yards away. "Assisted" station keeping can also provide improved observability via a MASK display to a conning officer controlling bridge operations. Both MASK fully autonomous (e.g., fully autonomous, closed-loop follower ship control) and "assisted" solutions can remove the distance line handlers from the decks of both vessels for reduced manning and improved crew safety. MASK can also protect the entire length of both ships' hulls through monitoring.

MASK can use "relative position difference predictions" within a local, moving reference frame. Typically, systems and/or displays can use an absolute position (e.g., latitude and longitude) with the Earth as the reference frame, or to a larger reference frame with the Sun as the reference (e.g., for space travel). In an example, the MASK system, device, and/or display can place the guide ship as a "center of the universe" frame of reference and show predictions relative to that frame of reference, even as the guide ship moves through a "space" of the ocean.

Referring back to FIG. 3A, MASK device and/or system can include a display 200. The display can include various graphical elements that can assist in station keeping or other underway or at-sea operations, such as an overtake or approach maneuver. In an example, the display can include a graphical ship swim lane display 210, graphical ship target plot display 230, a configuration display 260, a ship course and speed display 280, or some variation of the elements in these displays. The display can use various colors or shading to assist and alert a user to make a beneficial decision.

Figure 3B:
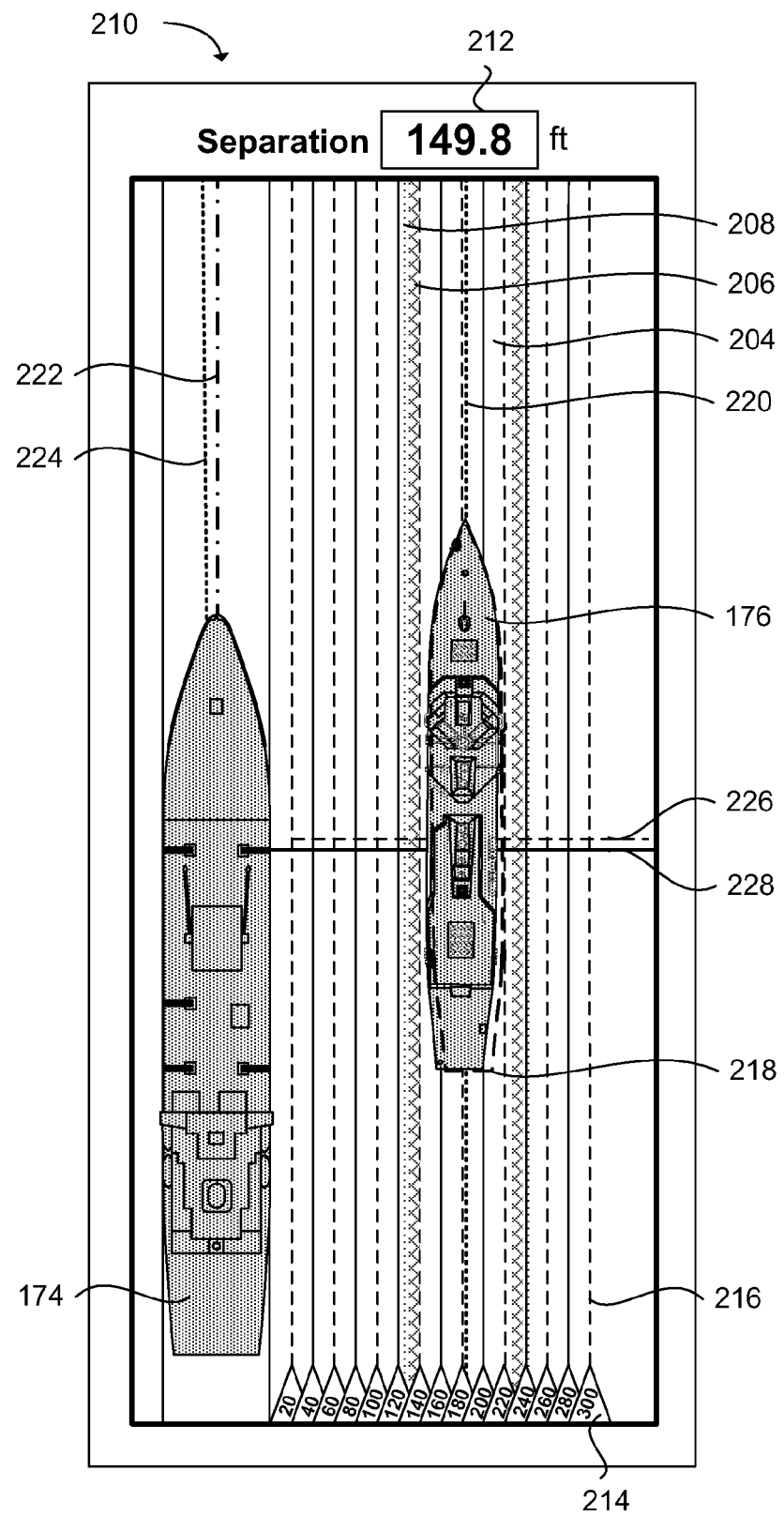
FIG. 3B illustrates a diagram of a graphical ship swim lane display of a maritime autonomous station keeping (MASK) interactive display in accordance with an example.

FIG. 3B illustrates the graphical ship swim lane display 210 in greater detail. The graphical ship swim lane display can graphically represent the following ship 176 relative to the guide ship 174. Distance marker flags 214 with virtual swim lanes 216 can show the following ship distance relative to the guide ship. The distance marker flags can be configured for any increment (e.g., 20 feet (ft)). The graphical ship swim lane display can include an actual separation distance 212 (e.g., 149.8 ft) between transfer stations at the following ship hull and the guide ship hull or an actual lateral separation distance from a transfer station of one of the ship's hull to the other ships hull. The graphical ship swim lane display can include a predicted following ship position 218 based on a predicted relative future position and/or and orientation of the following ship overlaid on an actual following ship position. The actual ship position can include a position shortly after processing the GPS signal, the SRP measurement, and/or the REPs from both the following ship and the guide ship. The predicted future position can be configured for a specified time (e.g., 2 seconds (sec)) in the future based on trending of the SRP and/or REPs (and/or other inputs, such as actual course or speed).

The graphical ship swim lane display can include a target following ship position or indication (not shown) overlaid on an actual following ship position. The target following ship position can indicate an ideal relative location and orientation between the following ship and the guide ship. The graphical ship swim lane display can indicate the actual following ship course 220 referenced from the following ship and the actual following ship course 224 relative to the target (e.g., "Romeo") guide ship course 222. The graphical ship swim lane display can indicate a safe region swim lane 204, a caution region swim lane 206 (e.g., ±10 ft from a target separation), and/or an alert region swim lane 208 (e.g., ±20 ft from the target separation). The safe region can indicate a normal distance tolerance for station keeping. The caution region can indicate a distance outside a recommended tolerance for station keeping. The alert region can indicate a distance which can trigger an alert. The alert may notify specified personnel, be displayed in alert display (272 of FIG. 3D), be logged for a performance evaluation of a station keeping operation, or trigger automated controls to override manual controls and move the following ship back into the recommended tolerance distance range. In another example, other identified regions can be used for various actions or alerts. The graphical ship swim lane display can indicate a guide ship station 228 (or perpendicular line) from the guide ship transfer station and a following ship station 226 (or perpendicular line) from the following ship transfer station which can be used for alignment of the ships. The separation between the two lines can be another indicator of a fore or aft deviation. Ideally, MASK can be used to adjust the course or speed of the following ship, so the guide ship perpendicular line and the following ship perpendicular line can overlay one another. A separation of the guide ship perpendicular line and the following ship perpendicular line beyond a specified tolerance may generate an alert.

Figure 3C:
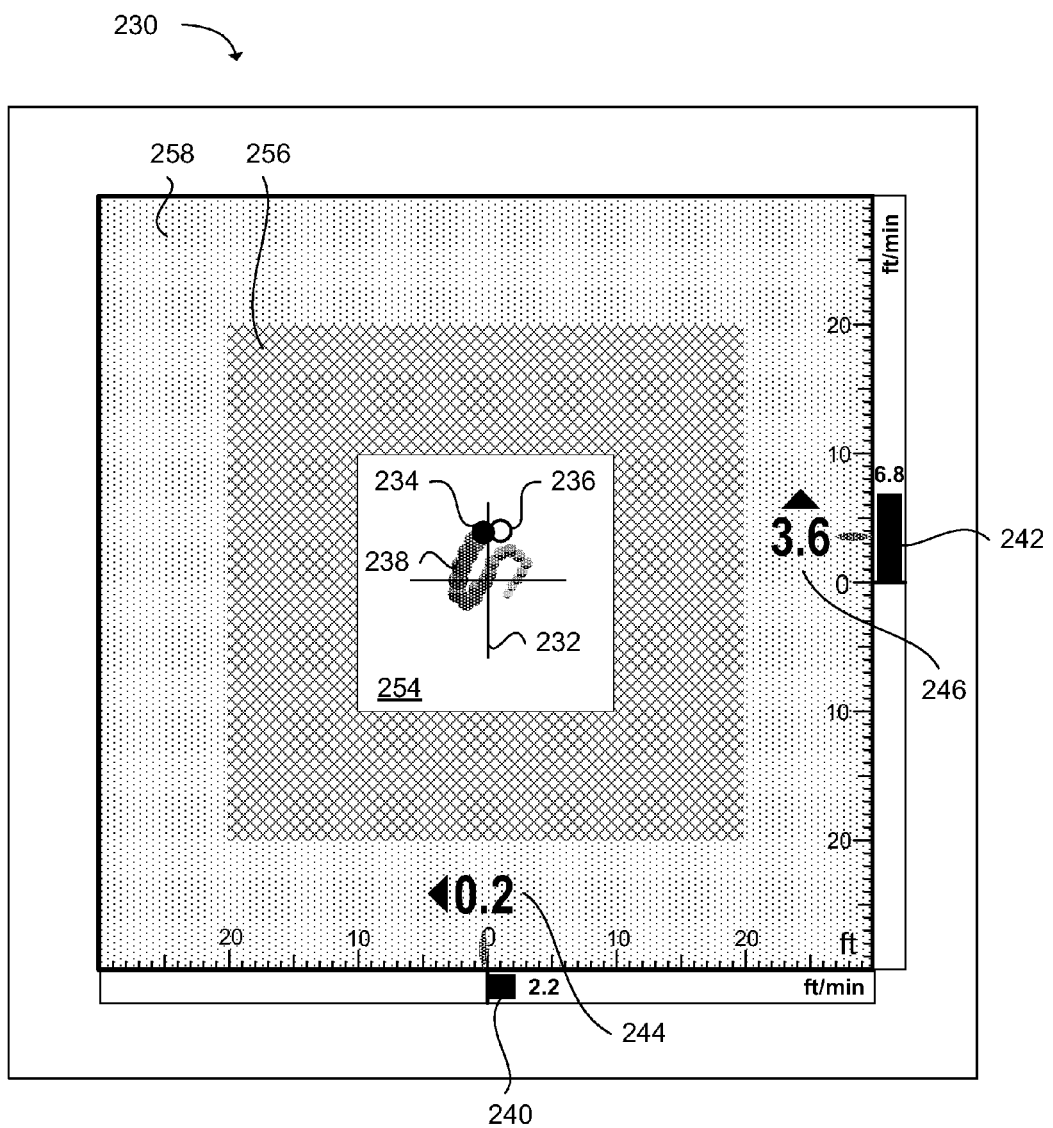
FIG. 3C illustrates a diagram of a graphical ship target plot display of a maritime autonomous station keeping (MASK) interactive display in accordance with an example.

FIG. 3C illustrates the graphical ship target plot display 230 in greater detail. The graphical ship target plot display can include a current location 234 (relative to a desired on-station location) of the following ship in a surge direction and a sway direction relative to the guide ship, which can include a gradually fading history of past relative locations 238, a predicted location 236 of the following ship in a surge direction and a sway direction relative to the guide ship, and a target location 232 (e.g., cross hairs) or desired on-station location to identify a desired relative location between the following ship and the guide ship. The graphical ship target plot display can indicate a safe region 254 (corresponding the safe region swim lane (204 of FIG. 3B) for the sway direction), a caution region 256 (corresponding the caution region swim lane (206 of FIG. 3B) for the sway direction), and/or an alert region 258 (corresponding the alert region swim lane (208 of FIG. 3B) for the sway direction). In another example, other identified regions can be used for various actions or alerts. The graphical ship target plot display can include rate of change bars of the guide ship relative to the following ship in the surge (longitudinal) 242 and the sway (lateral) 240 direction. The rate of change bars can provide a visual cue of the magnitude of the lateral and longitudinal rate of change to correct a deviation. The bars can be linearly scaled to a velocity unit (e.g., feet/minute (ft/min)). As shown, the lateral deviation 244 is left, but the lateral rate of change bar 240 shows that a right correction is occurring. Longitudinally, a forward deviation 246 is occurring and growing per the longitudinal rate of change bar 242, which can indicate to reduce the speed of the following ship. The deviation direction arrows can reflect whether the deviation is left/right 244 and fore/aft 246 of on-station. The arrows can be helpful when the deviations are small and difficult to tell which direction the deviation is occurring with only a number and tick mark shown.

Figure 3D:
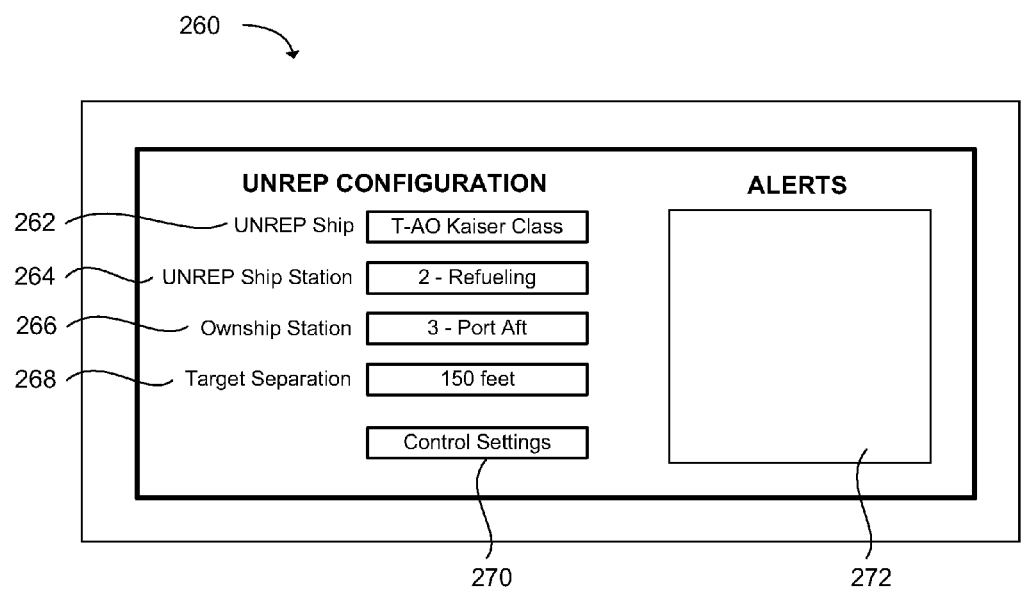
FIG. 3D illustrates a diagram of a configuration display of a maritime autonomous station keeping (MASK) interactive display in accordance with an example.

FIG. 3D illustrates the configuration display 260 in greater detail. The configuration display can include information such as a guide ship type 262, a guide ship point 264 (e.g., transfer station) to align, a following ship point 266 (e.g., transfer station) to align, a target separation distance 268 between the guide ship hull and the following ship hull, a control setting selection button 270, or an alert display 272. Each ship can have multiple transfer stations which can be used and aligned for station keeping. The control settings can be used to adjust the elements of the display to be visible or open a window to adjust other control settings.

Figure 3E:
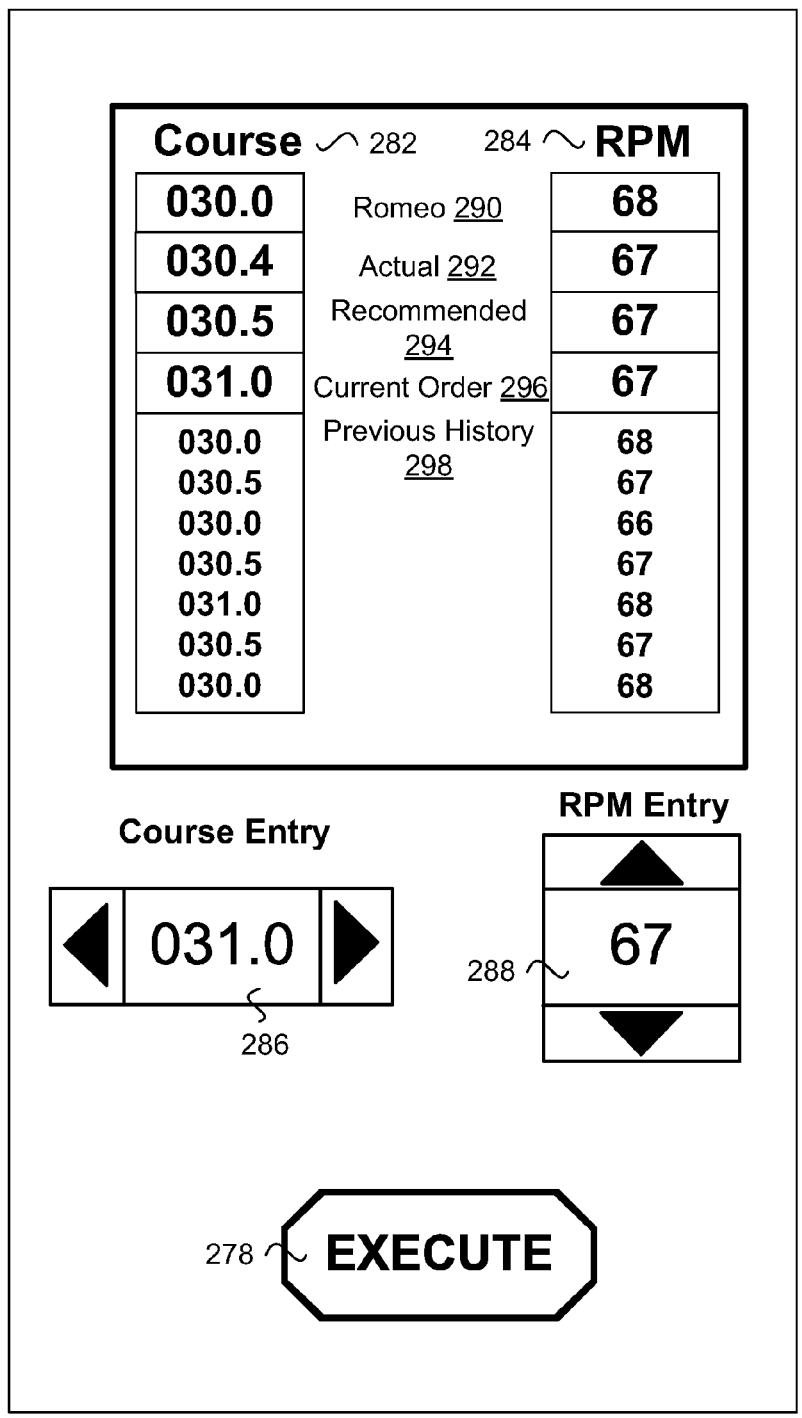
FIG. 3E illustrates a diagram of a ship course and speed display of a maritime autonomous station keeping (MASK) interactive display in accordance with an example.

FIG. 3E illustrates the ship course and speed display 280 in greater detail. The ship course and speed display can include a following ship actual course and speed relative to a guide ship target course (e.g., Romeo 290 course) and a guide ship target speed (e.g., Romeo speed). A speed can be represented in knots or determined by the revolutions per minute (RPM) of a ship's engine. RPM can be a measure of the frequency of a rotation of a mechanical component (e.g., engine), which can annotate the number of full rotations completed in one minute around a fixed axis. The target or "Romeo" course and speed (e.g., RPM) can be course and speed the guide ship agrees to work to hold steady during the operation (e.g., station keeping). MASK can be used to maintain a given station relative to the guide ship. For example, if the following ship is too close to the guide ship, MASK via the display can recommend a course right of Romeo (as shown) to move away from the guide ship. If the following ship is too far away from the guide ship, MASK can recommend a course left of Romeo to close the gap. If the following ship is too far behind the guide ship, a speed greater than Romeo can be recommended. If the following ship gets ahead of the guide ship, a speed less than Romeo (as shown) can be recommended. Once on-station and holding steady, a recommendation can mirror Romeo values until a deviation occurs (e.g., due to sea state, waves, or wind). A following ship course display 282 or a following ship speed display 284 can include an actual 292 course or speed, a recommended 294 course or speed, a current order 296 of course or speed, or a recent previous history 298 of past courses or speeds. A following ship course and a following ship speed can be selected from the recommended course or speed, or a user entry course 286 or a user entry speed 288. In an example, the recommended course or speed can be automatically filled in as a default course or speed, each time the recommendation changes. The ship course and speed display may allow the recommended course or speed, or the user entry course or the user entry speed to be executed 278. The ship course and speed display may be in communication with a controller to adjust the course and speed of the following ship. Other elements of the display may also be used to enhance the station keeping operation. The display may also be configured and adapted for various at-sea operations to show relevant information for other underway or at-sea operations.

Figure 4:
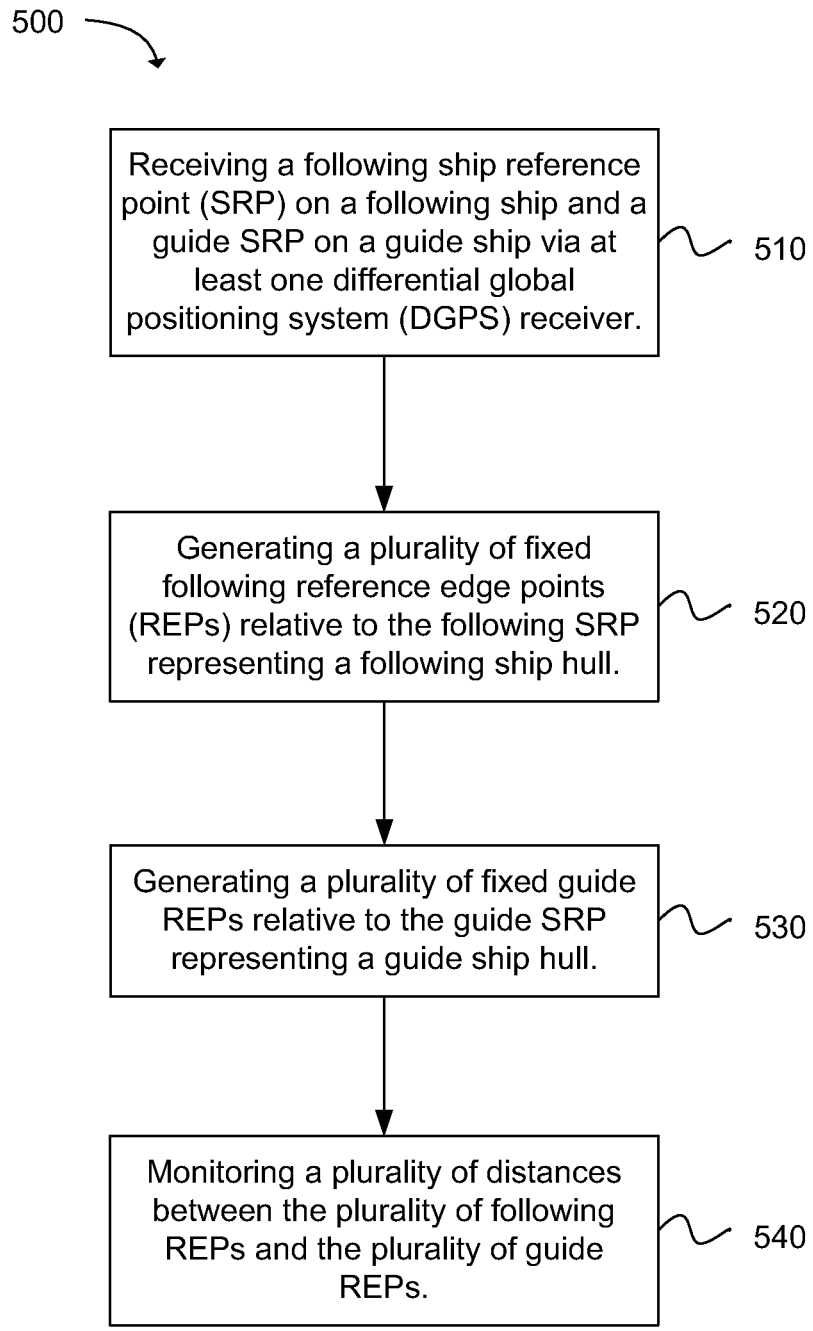
FIG. 4 depicts a flow chart of a method for maintaining distances between hulls of at least two ships on a waterway in accordance with an example.

Another example provides a method 500 for maintaining distances between hulls of at least two ships on a waterway, as shown in the flow chart in FIG. 4. The method may be executed as instructions on a machine, where the instructions are included on at least one computer readable medium or one non-transitory machine readable storage medium. The method can be used for determining a point-to-point separation between a first ship (e.g., guide ship) and a second ship (e.g., following ship). The method includes the operation of receiving a following ship reference point (SRP) on a following ship and a guide SRP on a guide ship via at least one differential global positioning system (DGPS) receiver, as in block 510. The operation of generating a plurality of fixed following reference edge points (REPs) relative to the following SRP representing a following ship hull follows, as in block 520. The next operation of the method can be generating a plurality of fixed guide REPs relative to the guide SRP representing a guide ship hull, as in block 530. The method can further include monitoring a plurality of distances between the plurality of following REPs and the plurality of guide REPs, as in block 540.

The method can further include generating an alert when a distance between a following REP and a guide REP falls outside an acceptable range. The method can further include modifying a following ship course or a following ship speed based on the alert. In an example, the method can further include displaying the following ship position based on the following REPs relative to the guide ship position based on the guide REPs.

Figure 5:
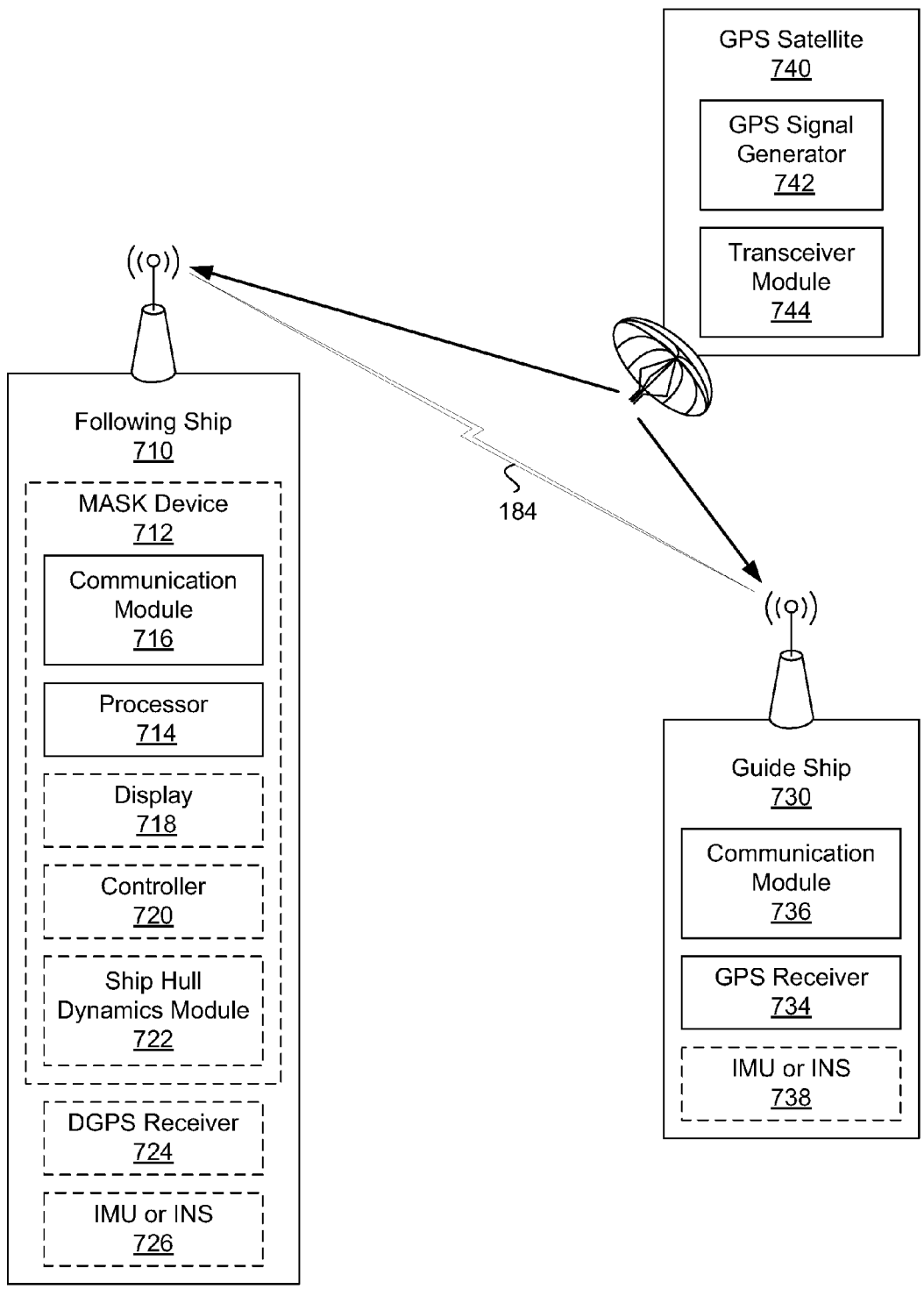
FIG. 5 illustrates a block diagram of a following ship, a guide ship, and a GPS satellite in accordance with an example.

FIG. 5 illustrates an example following ship 710, an example guide ship 730, and an example GPS satellite 740. The GPS satellite can include a GPS signal generator 742 to generate a GPS signal, and a transceiver module 744 to transmit the GPS signal. The following ship can receive the GPS signal via at least one differential global positioning system (DGPS) receiver 724, and the guide ship can receive the GPS signal via at least one GPS receiver 734, which can include a DGPS receiver. A communication module 716 of the guide ship can communicate with a communication module 736 of the following ship via a radio link 184, which can include GPS position, course, or speed information of the guide ship.

The following ship 710 (or the guide ship 730) can include a maritime autonomous station keeping (MASK) interactive device 712. The MASK device can be configured to determine a point-to-point separation between a guide ship and a following ship. The MASK device can include the communication module 716, a processor 714, a display 718, a controller 720, or a ship hull dynamics module 722. The communication module can be configured for communication with the at least one DGPS receiver 724 on a following ship using a wired connection, an optical fiber connection, or radio communication. The communication module can be further configured for communication with at least one of an inertial navigation system (INS) processor or an inertial measurement unit (IMU) 726 of the following ship, at least one of an INS processor or an IMU of the guide ship 738, or at least one GPS receiver 734 (e.g., DGPS receiver) on the guide ship.

The communication module 716 can be configured to receive a following ship reference point (SRP) generated by at least one DGPS receiver on a following ship 710 relative to a guide SRP generated by at least one DGPS receiver on a guide ship 730. The processor 714 can be configured to generate a plurality of fixed following reference edge points (REPs) relative to the following SRP representing a following ship hull, generate a plurality of fixed guide REPs relative to the guide SRP representing a guide ship hull, and monitor a plurality of distances between the plurality of following REPs and the plurality of guide REPs.

The display 718 (e.g., 200 of FIG. 3A) can be configured to represent a position of the following ship hull relative to the guide ship hull. The display can include a graphical ship swim lane display (e.g., 210 of FIG. 3A-B), graphical ship target plot display (e.g., 230 of FIG. 3A,C), a configuration display (e.g., 260 of FIG. 3A,D), or a ship course and speed display (e.g., 280 of FIG. 3A,E). The display can include at least one of a portable display, a shock resistant display, a touch screen, a function button, a cursor control, and a brightness control. The graphical ship swim lane display can include: The following ship hull relative to the guide ship hull with distance flags from the guide ship hull; a predicted following ship position overlaid on an actual following ship position, where the predicted following ship position indicates a future relative location and orientation between the following ship 710 and the guide ship 730; a target following ship position overlaid on an actual following ship position, where the target following ship position indicates an ideal relative location and orientation between the following ship and the guide ship; or an actual separation between the following ship hull and the guide ship hull. The graphical ship target plot display can include: A current location of the following ship in a surge direction and a sway direction relative to the guide ship with a gradually fading history of past relative locations; a predicted location of the following ship in a surge direction and a sway direction relative to the guide ship; a target location to identify a desired relative location between the following ship and the guide ship; or a rate of change of the guide ship relative to the following ship in the surge and the sway direction. The configuration display can include information such as a guide ship type, a guide ship point (e.g., transfer station) to align, a following ship point (e.g., transfer station) to align, a target separation distance between the guide ship hull and the following ship hull, a control setting, or an alert. The ship course and speed display can include a following ship course and speed relative to a guide ship target course and a guide ship target speed. A following ship course display or a following ship speed display can include an actual course or speed, a recommended course or speed, a current order of course or speed, or a recent previous history of courses or speeds. A following ship course and a following ship speed can be selected from the recommended course or speed, or a user entry course or a user entry speed.

The processor 714 can be further configured to recommend a change in a following ship course or a following ship speed to perform an overtake or approach maneuver or station keep on an intended station. The controller 720 can be configured to modify the following ship course or the following ship speed. The controller can automatically modify the following ship course or the following ship speed based on a recommended course or speed, or the controller can modify the following ship course or the following ship speed based on a user input. In an example, the processor or the controller can use a proportional-integral-derivative controller (PID controller), which can include a generic control loop feedback mechanism or controller used in a control system. The PID controller can calculate an "error" value as the difference between a measured process variable (e.g., a guide ship REP relative to a following ship REP) and a desired setpoint (e.g., specified distance). The PID controller can attempt to minimize the error by adjusting process control inputs (e.g., a following ship course or speed).

The ship hull dynamics module 722 can be configured to estimate a trend of the following ship hull and the guide ship hull using a plurality of following SRP measurements and a plurality of guide SRP measurements measured over time and accounting for ship hull dynamics including a Venturi effect generated by the combination of the motions of the following ship 710 and the guide ship 730.

In another configuration, a maritime autonomous station keeping (MASK) system can be used for maintaining distances between hulls of at least two ships on a waterway. The MASK system can include at least one differential global positioning system (DGPS) receiver 724, a processor 714, a radio (e.g., communication module 716), an output device (e.g., a display 718), a controller 720, an inertial navigation system (INS) processor or an inertial measurement unit (IMU) 726, or a second DGPS receiver. The at least one DGPS receiver can provide a following ship reference point (SRP) on a following ship 710 relative to a guide SRP on a guide ship 730. The radio can receive the guide SRP from at least one GPS receiver 734 (e.g., DGPS receiver) on the guide ship. The processor can generate a plurality of fixed following reference edge points (REPs) relative to the following SRP representing a following ship hull, generate a plurality of fixed guide REPs relative to the guide SRP representing a guide ship hull, and monitor a plurality of distances between the plurality of following REPs and the plurality of guide REPs.

The output device can generate a position of the following ship hull relative to the guide ship hull for a user. The output device can include a display (e.g., screen or monitor), a printer, a projector, an audio device (e.g., speaker), or a tactile device providing tactile feedback. The output device can include a display 718 to graphically represent the following ship hull and the guide ship hull. The display can include: A ship swim lane display; a ship target plot display; a configuration display; or a ship course and speed display (e.g., FIG. 3A-E).

The controller 720 can modify the following ship course or the following ship speed. The controller can automatically modify the following ship course or the following ship speed based on a recommended course or speed generated by the processor, or the controller can modify the following ship course or the following ship speed based on a user input. The INS processor or the IMU 726 on the following ship can determine the position of the plurality of following REPs based on a motion of the following ship. The second DGPS receiver on the following ship at a fixed distance from the at least one DGPS receiver can determine the position of the plurality of following REPs based on a motion of the following ship. The motion of the following ship can include pitch, roll, yaw, sway, heave, surge, rotation, or translation. The at least one DGPS receiver or the second DGPS receiver can generate the following SRP or the guide SRP using measurements for pseudo-range (PR) and carrier phase (CP) provided by an almost fixed integer ambiguity (AFIA) module using a geometry extra redundant almost fixed solution (GERAFS). The processor can be further configured to estimate a trajectory of the following ship hull and the guide ship hull using a plurality of following SRP measurements and a plurality of guide SRP measurements measured over time. The processor can model a Venturi effect based on the estimated trajectory of the following ship hull and the guide ship hull.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The positioning systems, GPS receivers, and/or monitors may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A maritime autonomous station keeping (MASK) interactive device, comprising:
a communication module to receive a following ship reference point (SRP) generated by at least one differential global positioning system (DGPS) receiver on a following ship relative to a guide SRP generated by at least one DGPS receiver on a guide ship;
a processor to:
generate a plurality of fixed following reference edge points (REPs) relative to the following SRP representing a following ship hull,
generate a plurality of fixed guide REPs relative to the guide SRP representing a guide ship null, and monitor a plurality of distances between the plurality of fixed following REPs and the plurality of fixed guide REPs,
recommend a change in at least one of a following ship course and a following ship speed based on an error value between a measured variable and a desired setpoint as to the plurality of fixed following REPs and the plurality of fixed guide REPs, to perform at least one of an overtake maneuver and a station keep on an intended station; and a controller operable to automatically modify at least one of the following ship course and the following ship speed for correction of the error value, based on at least one of a recommended course and a recommended speed, wherein the controller optionally modifies at least one of the following ship course and the following ship speed based on a user input.

2. The MASK interactive device of claim 1, further comprising:
a display to represent a position of the following ship hull relative to the guide ship hull.

3. The MASK interactive device of claim 2, wherein the display further comprises:
a graphical ship swim lane display of at least one of:
the following ship hull relative to the guide ship hull with distance flags from the guide ship hull,
a predicted following ship position overlaid on an actual following ship position, wherein the predicted following ship position indicates a future relative location and orientation between the following ship and the guide ship,
a target following ship position overlaid on an actual following ship position, wherein the target following ship position indicates an ideal relative location and orientation between the following ship and the guide ship, and
an actual separation between the following ship hull and the guide ship hull.

4. The MASK interactive device of claim 2, wherein the display further comprises:
a graphical ship target plot display of at least one of:
a current location of the following ship in a surge direction and a sway direction relative to the guide ship with
a gradually fading history of past relative locations,
a predicted location of the following ship in a surge direction and a sway direction relative to the guide ship,
a target location to identify a desired relative location between the following ship and the guide ship, and
a rate of change of the guide ship relative to the following ship in the surge and the sway direction.

5. The MASK interactive device of claim 2, wherein the display further comprises:
a configuration display of information selected from the group consisting of a guide ship type, a guide ship point to align, a following ship point to align, a target separation distance between the guide ship hull and the following ship hull, a control setting, an alert, and combinations thereof.

6. The MASK interactive device of claim 2, wherein the display further comprises:
a ship course and speed display including a following ship course and speed relative to a guide ship target course and a guide ship target speed, wherein a following ship course display or a following ship speed display is selected from the group consisting of an actual course or speed, a recommended course or speed, a current order of course or speed, a recent previous history of courses or speeds, and combinations thereof, and a following ship course and a following ship speed is selected from the recommended course or speed, or a user entry course or a user entry speed.

7. The MASK interactive device of claim 2, wherein the display includes at least one of a portable display, a shock resistant display, a touch screen, a function button, a cursor control, and a brightness control.

8. The MASK interactive device of claim 1, wherein the processor further comprises:
a ship hull dynamics module to estimate a trend of the following ship hull and the guide ship hull using a plurality of following SRP measurements and a plurality of guide SRP measurements measured over time and accounting for ship hull dynamics including a Venturi effect generated by a combination of motions of the following ship and the guide ship.

9. The MASK interactive device of claim 1, wherein the communication module is in communication with the at least one DGPS receiver on a following ship using a wired connection, an optical fiber connection, or radio communication.

10. The MASK interactive device of claim 1, wherein the communication module is further configured for communication with at least one of an inertial navigation system (INS) processor or an inertial measurement unit (IMU) of the following ship, at least one of an INS processor or an IMU of the guide ship, and at least one DGPS receiver on the guide ship.

11. A method for maintaining distances between hulls of at least two ships on a waterway, comprising:
receiving a following ship reference point (SRP) on a following ship and a guide SRP on a guide ship via at least one differential global positioning system (DGPS) receiver;
generating a plurality of fixed following reference edge points (REPs) relative to the following SRP representing a following ship hull;
generating a plurality of fixed guide REPs relative to the guide SRP representing a guide ship hull;
monitoring a plurality of distances between the plurality of fixed following REPs and the plurality of fixed guide REPs;
recommending a change in at least one of a following ship course and a following ship speed based on an error value between a measured variable and a desired setpoint as to the plurality of fixed following REPs and the plurality of fixed guide REPs, to perform at least one of an overtake maneuver and a station keep on an intended station; and
using a controller, automatically modifying at least one of the following ship course and the following ship speed for correction of the error value, based on at least one of a recommended course and a recommended speed, the controller optionally modifying at least one of the following ship course and the following ship speed based on a user input.

12. The method of claim 11, further comprising:
generating an alert when a distance between a following REP and a guide REP falls outside an acceptable range.

13. The method of claim 12, further comprising:
modifying a following ship course or a following ship speed based on the alert.

14. A computer program product, comprising a non-transitory computer readable storage medium having a computer readable program code embodied therein, the computer readable program code adapted to be executed to implement the method of claim 11.

15. A maritime autonomous station keeping (MASK) system for maintaining distances between hulls of at least two ships on a waterway, comprising: at least one differential global positioning system (DGPS) receiver providing a following ship reference point (SRP) on a following ship relative to a guide SRP on a guide ship;

a radio to receive the guide SRP from at least one DGPS receiver on the guide ship;

a processor to:

generate a plurality of fixed following reference edge points (REPs) relative to the following SRP representing a following ship hull, generate a plurality of fixed guide REPs relative to the guide SRP representing a guide ship hull, and monitor a plurality of distances between the plurality of fixed following REPs and the plurality of fixed guide REPs; and a controller operable to modify at least one of the following ship course and the following ship speed for correction of an error value between a measured variable and a desired setpoint as to the plurality of fixed following REPs and the plurality of fixed guide REPs, based on at least one of a recommended course and speed as generated by the processor based on the error value, wherein the controller optionally modifies at least one of the following ship course and the following ship speed based on a user input.

16. The system of claim 15, further comprising:

an output device to generate a position of the following ship hull relative to the guide ship hull for a user.

17. The system of claim 16, wherein the output device further comprises:

a display to graphically represent the following ship hull and the guide ship hull, wherein the display includes at least one of:
  a ship swim lane display;
  a ship target plot display;
  a configuration display; and
  a ship course and speed display.

18. The system of claim 15, further comprising:

an inertial navigation system (INS) processor or an inertial measurement unit (IMU) on the following ship to modify a position of the plurality of following REPs based on a motion of the following ship, wherein the motion of the following ship is selected from the group consisting of pitch, roll, yaw, sway, heave, surge, translation, and combinations thereof.

19. The system of claim 15, wherein the processor is further configured to:

estimate a trajectory of the following ship hull and the guide ship hull using a plurality of following SRP measurements and a plurality of guide SRP measurements measured over time, wherein the processor models a Venturi effect based on the estimated trajectory of the following ship hull and the guide ship hull.

20. The system of claim 15, further comprising:

a second DGPS receiver on the following ship at a fixed distance from the at least one DGPS receiver to modify a position of the plurality of following REPs based on a motion of the following ship, wherein the motion of the following ship is selected from the group consisting of pitch, roll, yaw, sway, heave, surge, translation, and combinations thereof.

21. The system of claim 15, wherein the at least one DGPS receiver is further configured to:

generate the following SRP or the guide SRP using measurements for pseudo-range (PR) and carrier phase (CP) provided by an almost fixed integer ambiguity (AFIA) module using a geometry extra redundant almost fixed solution (GERAFS).

* * * * *